United States Patent [19]

Burgh

[11] Patent Number: 5,241,773
[45] Date of Patent: Sep. 7, 1993

[54] FISHING ROD FOR BAIT FISH AND THE LIKE

[76] Inventor: Ron A. Burgh, P.O. Box 11182, Winslow, Wash. 98110

[21] Appl. No.: 983,804

[22] Filed: Nov. 30, 1992

[51] Int. Cl.$^5$ .............................................. A01K 87/00
[52] U.S. Cl. ........................................ 43/18.1; 43/24; 43/25
[58] Field of Search .................. 43/18.1, 24, 25, 42.74

[56] References Cited

U.S. PATENT DOCUMENTS

| | | | |
|---|---|---|---|
| 1,276,780 | 8/1918 | Lucas | 43/24 |
| 1,595,275 | 8/1926 | White | 43/24 |
| 2,334,646 | 11/1943 | Price | 43/18 |
| 2,394,706 | 2/1946 | Makie | 43/18 |
| 2,537,488 | 1/1951 | Stoner | 43/18 |
| 2,578,663 | 12/1951 | Beaupre | 43/18 |
| 2,729,012 | 1/1956 | Lee | 43/18.1 |
| 2,777,239 | 1/1957 | Cushman | 43/18.1 |
| 2,781,602 | 2/1957 | Warford | 43/24 |
| 2,792,660 | 5/1957 | Jennette | 43/24 |
| 3,432,958 | 3/1969 | Bellinger | 43/18.1 |
| 3,494,061 | 2/1970 | Pool | 43/19 |
| 3,727,338 | 4/1973 | Pedersen | 43/18 R |
| 4,121,369 | 10/1978 | Lopez | 43/18 R |
| 4,151,672 | 5/1979 | Lopez | 43/18 R |
| 4,223,466 | 9/1980 | King | 43/18 R |
| 4,654,994 | 4/1987 | Roberts, Jr. | 43/19 |
| 4,962,608 | 10/1990 | Loomis et al. | 43/18.1 |
| 5,040,323 | 8/1991 | Hughes, Jr. | 43/18.1 |

FOREIGN PATENT DOCUMENTS

| | | | |
|---|---|---|---|
| 588764 | 12/1959 | Canada | 43/24 |
| 1518831 | 2/1968 | France | 43/24 |

Primary Examiner—Kurt C. Rowan
Attorney, Agent, or Firm—Christensen, O'Connor, Johnson & Kindness

[57] ABSTRACT

A fishing rod (10) that includes a handle (14) to which a shaft (12) and reel (16) are attached. The shaft is formed with a bore (28). An open-mouthed flute (20) is attached to the end of the shaft distal from the handle. A fishing line (18) wound onto the reel extends through the shaft and the flute. A number of hooks (24) are attached to the fishing line (18) by a number of individual, relatively short, gangion lines (26). A weight (22) is attached to the free end of the fishing line (18). the flute and the shaft are dimensioned so that the fishing line and hooks can readily pass into the bore of the shaft. The flute is further dimensioned so that, as fishing line is wound onto the reel, the weight will abut the inside surface of the flute that defines the mouth. Thus, when the rod assembly (10) is not used, the hooks remain housed inside the shaft. This prevents the hooks from becoming caught on adjacent articles in the environment or becoming tangled among themselves.

20 Claims, 3 Drawing Sheets

FISHING ROD FOR BAIT FISH AND THE LIKE

FIELD OF THE INVENTION

This invention relates generally to fishing rods and, more particularly, to a fishing rod useful for catching small fish such as bait fish.

BACKGROUND OF THE INVENTION

Often before a fisherman attempts to catch large fish, such as salmon or halibut, he will first catch smaller fish, called bait fish. The bait fish, one such example being herring, is placed on the hooks used to capture the desired prey in order to lure the prey to the hook. Some small fish, such as herring and smelt, are also commonly caught for food. Small fish are traditionally caught with the aid of a jig line, which is attached to the fisherman's pole. A jig line is comprised of a fishing line to which a number of small, spaced-apart hooks are attached by gangion lines. Once placed in the water, the jig line is jigged (moved up and down rapidly) by the fisherman when a school of small fish is located. The rapid movement of the unbaited hooks attracts fish to the hooks where they are captured.

A problem with the use of a jig line is that the line can only be rewound on a pole to which it is attached to the point where the first gangion line reaches the end of the pole. The remainder of the gangion lines and the hooks dangle from the end of the fishing line. This leaves the hooks free to become tangled among themselves and/or to catch on adjacent gear or articles of clothing. The time spent having to untangle the hooks so that they can be placed back in the water can detract form a fisherman's ability to rapidly place a jig line in the water so that he can catch fish in a rapidly moving school. Moreover, the task of having to untangle the hooks or having to properly stow them to prevent their entanglement can depreciate the fisherman's overall enjoyment of the sport.

SUMMARY OF THE INVENTION

This invention relates to a new fishing rod assembly useful for catching small fish, such as bait fish, using a plurality of hooks, that prevents the entanglement of the hooks used to catch the fish.

The fishing rod assembly of this invention includes a fishing rod that includes a handle to which a tubular shaft is attached. A reel on which the fishing line is stored is secured to the handle. The main line extends through the shaft. A jig line to which a number of spaced-apart hooks are attached is secured to the free end of the main line. A weight having a selected diameter is attached to the free end of the jig line. A flute is located on the end of the shaft opposite the handle. The mouth of the flute and the bore defined by the shaft have diameters that are larger than the width of the hooks but smaller than the diameter of the weight. The mouth of the flute is sized to receive the end of the weight.

Once a fisherman has finished fishing with the rod of this invention and the fish are removed from the hooks, the fishing line is reeled into the shaft. The hooks move with the fishing line through the mouth of the flute into the bore of the shaft. The further reeling in of the fishing line forces the weight against the mouth of the flute. A lock mechanism integral with the reel then prevents the fishing line from unwinding and keeps the fishing line taut inside the shaft.

Once the hooks of the fishing rod of this invention are reeled into the shaft, they are shielded from the outside environment. This prevents the hooks from becoming caught on any object adjacent the rod assembly such as other gear or the fisherman's clothing. Since the line to which the hooks are attached becomes taut when it is reeled into the shaft, the hooks stay spaced apart from each other and do not tangle. Consequently, once the fishing line is reeled into the shaft, little additional care needs to be taken in stowing the rod assembly. The hooks can be readily placed in the water again by simply unlatching the reel to unreel the fishing line. This ability to rapidly get the hooks into the water increases the fisherman's ability to catch fish that are in a rapidly moving school.

BRIEF DESCRIPTION OF THE DRAWINGS

The invention is pointed out with particularity in the appended claims. The above and further advantages of the invention may be better understood by referring to the following description, taken in conjunction with the accompanying drawings, in which:

DETAILED DESCRIPTION OF THE PREFERRED EMBODIMENT

Figure 1:
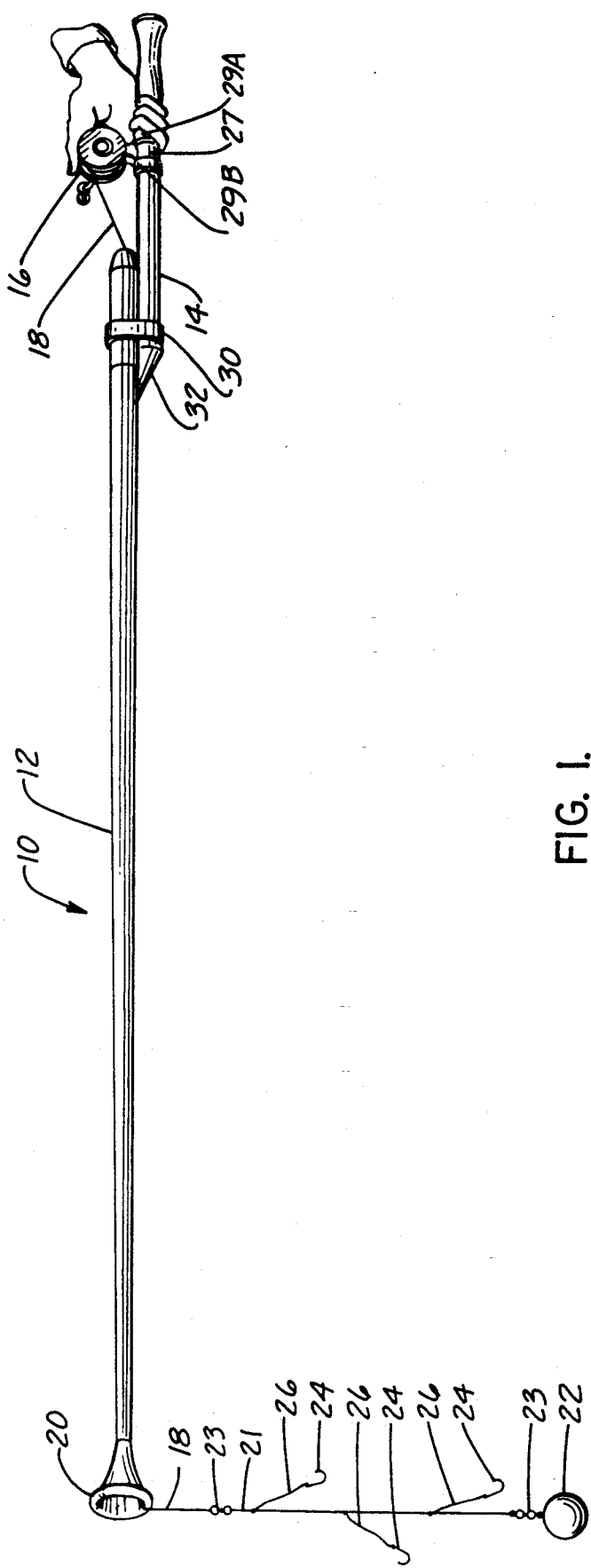
FIG. 1 is a side view illustrating the fishing rod of this invention.
Figure 2:
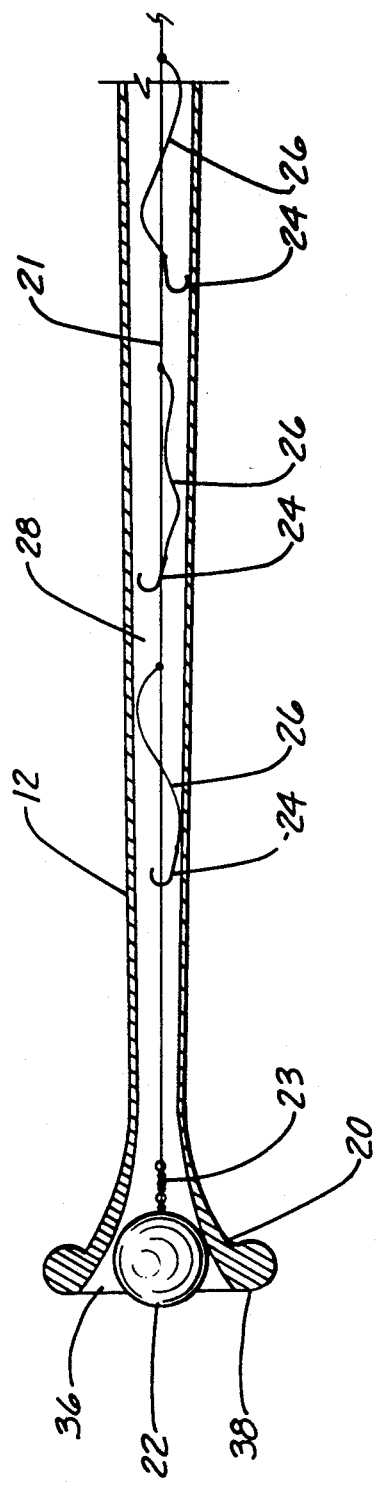
FIG. 2 is a cross-sectional view illustrating a portion of the shaft, the flute, the hooks, and the weight of the fishing rod of this invention.

FIGS. 1 and 2 illustrate a fishing rod assembly 10 of this invention. The fishing rod assembly 10 includes a tubular shaft 12 to which a handle 14 is attached at one end. A reel 16 on which fishing line 18 is stored is attached to the handle 14. A flute 20 is attached to the end of the shaft 12 distal from the end to which handle 14 is attached. The fishing line 18 extends through the shaft 12 and out through the flute 20.

A jig line 21 is attached to the free end of the fishing line 18 by a small swivel connector 23 or other suitable coupling mechanism. A set of hooks 24 is attached to the jig line 21 by a set of relatively short gangion lines 26. A weight 22 is attached to the end of the free end of the jig line 21 by a swivel connector 23.

The shaft 12 is formed of plastic, composite material, wood, or any other material capable of withstanding the loads to which a fishing rod is exposed. The shaft has a bore 28 with a diameter greater than the width across a hook 24 from its stem to its barb. For example, if the hooks 24 are 0.25 inch in width, the minimum diameter of the bore 28 should be at least 0.38 inch. In the illustrated version of the invention, the bore 28 has a tapered profile such that its narrowest diameter is adjacent the flute 20.

The handle 14 may be a separate piece or formed integrally with the shaft 12. In the depicted version of the invention, the handle is a separate element and is attached to the shaft by a metallic band 30. The end of the handle 14, distal from the reel 16, is provided with a tapered surface 32 to facilitate fitting the band 30 over the shaft and the handle 14. Alternatively, any other conventional means may be used to secure the handle 14 to the shaft 12. The reel 16 is any conventional reel on which the fishing line 18 can be wound. A locking mechanism with a releast lever (not illustrated) built into the reel 16 controls the winding and unwinding of the fishing line 18. A reel seat 27 integral with the reel 16 is positioned on top of the handle 14. The reel 16 is held in position by a pair of eccentrically shaped rings 29a and 29b that extend over the handle 14. Ring 29a is fixed in position over the end of the handle 14. Ring 29b is compression fitted over the reel seat 27 to facilitate the removal of the reel 16. In other versions of the invention, alternative means may be used to secure the reel 16 to the rod assembly 12. For example, in some versions of the invention, the reel seat 27 may be snap fitted, screw secured, or molded to the handle 14.

The fishing line 18 is any conventional fishing line. In versions of the invention employed to catch herring or similarly sized bait fish, it is recommended that line of approximately 5- to 30-lb. test strength be used. In versions of the invention that employ hooks 24 of approximately 0.5 inch top-to-bottom length, the gangion lines 26 that connect the hooks 24 to the fishing line 18 are approximately two inches in length and are connected to the fishing line 18 approximately six to eight inches apart from each other. The jig line 21 is of approximately 5- to 15-lb. test strength and the gangion lines 26 have a test strength of approximately 4 to 10 lb.

The flute 20 may be a separate part of the fishing rod assembly 10 of this invention or it may be formed integrally with the shaft 12. The flute 20 has a body that defines an outwardly tapered mouth 36 that is of narrow diameter adjacent where the flute is coupled with the shaft 12 and widest at the open end of the flute. The flute body is further shaped so that the weight 22 can be seated in the mouth 36 of the flute 20. For example, versions of the invention that employ hooks of 0.25 inch in width may have a weight 22 that is ball-shaped and approximately 0.75 inch in diameter. In these versions of the invention, the flute body is shaped so that the narrowest section of the mouth 36 is 0.38 inch in diameter and the widest portion is 1.0 inch in diameter. The portion of the flute body defining the mouth 36 is further formed to have an outwardly curved profile; this facilitates the movement of the hooks 24 into the shaft 12. The flute 20 also has an outwardly curved lip 38 that extends outward from the open end of the mouth 36. The lip 38 has a circular profile and a radius of curvature greater than the width of the hooks 24 with which the rod assembly 10 is used. This profile minimizes the possibility that the hooks 24 will become caught on the flute 20 as they are reeled into the shaft 12.

When use of the fishing rod assembly 10 of this invention is desired, the locking mechanism on the reel 16 is released and the fishing line is lowered in a normal manner. Once the desired fish have been caught, the fishing line 18 is wound back onto the reel 16. After the fish are removed from the hooks 24, the fisherman continues to wind the fishing line 18 onto the reel 16. The hooks 24 slide over the inside surface of the flute body, pass through the mouth 36 of the flute, and into the bore 28 of the reel body 12. The winding of the fishing line 18 onto the reel 16 is stopped by the action of the weight 22 abutting the inner surface of the body of the flute 20. Once the fishing line is initially held taut inside the reel body 12, the locking mechanism on the reel 16 prevents the fishing line from unwinding; this maintains the fishing line 18 in a taut state inside the shaft 12.

Once the fishing line 18 is locked into position, the hooks 24 are held in place inside the shaft 12. The shaft 12 shields the hooks 24 from the outside environment so they do not become caught on adjacent fishing gear or on the fisherman's clothing. Since the diameter of the bore 28 of the shaft is not much greater than the width of the hooks 24, the hooks are restricted from significant lateral movement relative to the fishing line 18. The hook-gangion line spacing is greater than the overall hook-gangion line length. This prevents a hook from catching on the adjacent gangion lines. This restriction on hook 24 movement and the relative spacing of the hooks prevent the hooks from becoming caught on each other or on their own gangion lines. Thus, when use of the rod assembly 10 is again desired, the hooks 24 are in a ready, untangled state. All that is necessary to release the hooks 24 is to simply unlock the reel 16 so that the fishing line can be unwound.

Moreover, since the open end of the mouth 36 of the flute 20 is larger than the weight 22, once the fishing line 18 is wound up, the weight is substantially seated inside the mouth of the flute. This reduces the likelihood that the weight 22 could somehow become separated from the rest of the assembly in the event that the end of the rod to which the weight is attached is inadvertently bumped against another object.

Figure 3:
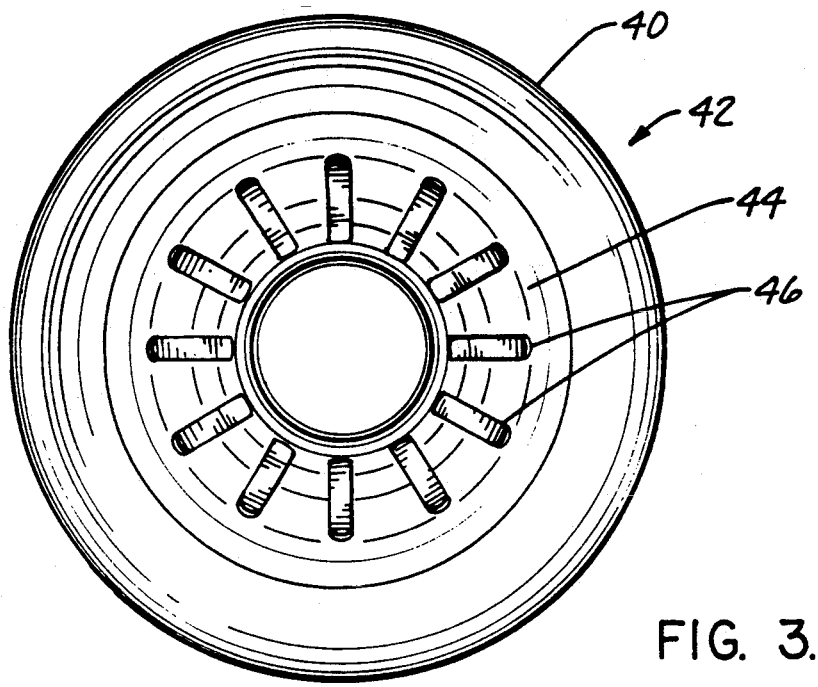
FIG. 3 is a plan view of the front face of an alternative flute of the fishing rod of this invention.

FIG. 3 illustrates an alternative flute 40 that can be used with the rod assembly of this invention. Flute 40 includes a flute body 42 that defines a flute mouth 44 similar to the previously described flute 20. The flute body 42, in addition to having an outwardly curved profile, has a number of outwardly extending tabs 46 that extend radially outward from the center of the mouth. The tabs 46, which are disposed circumferentially around the flute body, serve as members upon which the weight 22 (FIG. 1) rests when the fishing line is wound into position. By providing the flute 40 with the tabs 46, the surface contact between the weight 22 and the flute 40 is reduced. This minimizes the surface friction between the weight 22 and the flute 40. Consequently, when the fishing line 18 is released, the weight will readily fall out of the flute 40 to facilitate the quick lowering of the hooks 24 into the water. In preferred versions of this embodiment of the invention, the tabs 46 have tapered surfaces that merge into the outer surface of the body of the flute 40. The slope nature of these surfaces prevents the hooks 24 from becoming caught on the tabs as they are drawn into the flute 40 and the shaft 12 (FIG. 1).

Figure 4:
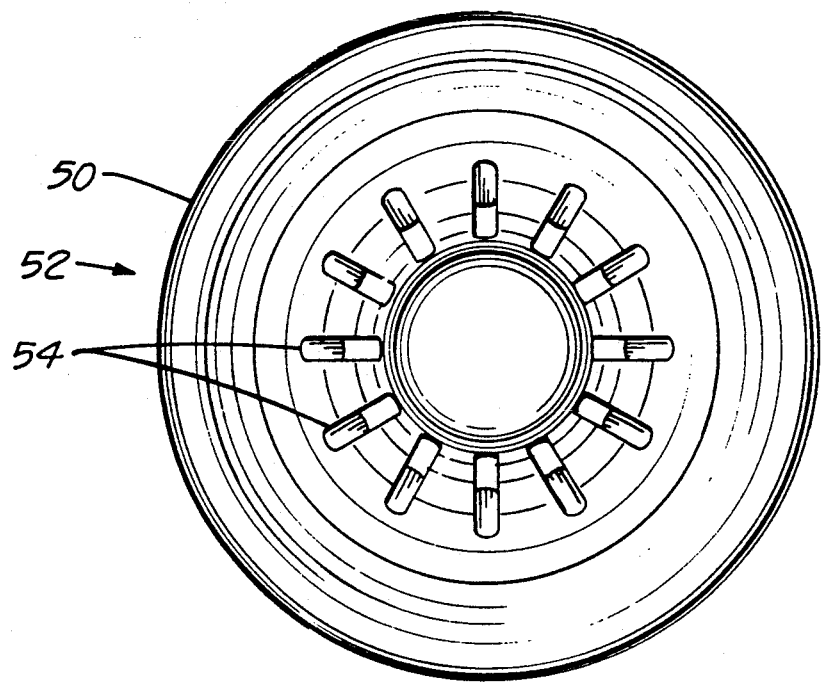
FIG. 4 is a plan view of the front face of an alternative flute of the fishing rod of this invention.

An alternative flute 50 is depicted by FIG. 4. Flute 50 is formed with a flute body 52 that defines a number of slits 54 that extend radially outward from the center of mouth of the flute. The slits 54 are positioned so that, when the weight 22 (FIG. 2) is disposed in the flute, the weight is seated over the slits. The slits 54 minimize the surface contact between the weight 22 and the flute 50 to facilitate the rapid movement of the weight, the lines, and hook when the locking mechanism is released. The slits are relatively narrow, typically less than a ¼ inch in width and often less then ⅛ inch in width. The small width of the slits 54 minimizes the possibility that a hook 24 can become caught in a slit as it is retracted into the rod shaft 12. Moreover, in most preferred embodiments of the invention, the slits 54 do not extend through the flute 50. This further minimizes the chance that the hooks 24 will become caught in the slits 54.

It should be understood that the foregoing description is for the purposes of illustration only and alternative embodiments are possible without departing from the scope of the claims. For example, in some versions of the invention, it may be desirable to form the basic flute integrally with the shaft and to provide a metal layer over the basic flute body structure that functions as the actual surface of the flute upon which the fishing line 18 and hooks 24 travel and the weight 22 rests. The shape of the tabs 46 formed on the flute or of the slits 54 formed in the flute may vary significantly from what has been shown. It should also be similarly clear that in other versions of the invention it may be an advantage to have hooks of different size and that one version of the rod assembly of this invention may be used with various sized hooks. It may also be desirable to attach the hooks directly to the fishing line or to attach the gangion lines directly to the fishing line. In these embodiments of the invention, the weight will be attached to the free end of the fishing line. Therefore, it is the object of the appended claims to cover all such variations and modifications that come within the true spirit and scope of the invention.

The embodiments of the invention in which an exclusive property or privilege is claimed are defined as follows:

1. A fishing rod comprising
    a handle;
    a reel assembly, including a reel attached to said handle and a line wound on said reel, wherein said reel is used to selectively wind and unwind said fishing line and said fishing line has a free end distal from said reel;
    a weight attached to said free end of said fishing line, said weight having a selected maximum diameter;
    a hook and a gangion line pair, wherein said gangion line extends between said hook and said fishing line, said gangion line is attached to said fishing line adjacent said weight, and said hook has a width less than said maximum diameter of said weight;
    a shaft attached to said handle and having a free end distal from said end to which said handle is attached, said shaft having a bore extending longitudinally therethrough, wherein said fishing line, said gangion line, and said hook are releasably disposed in said shaft; and
    a flute attached to said free end of said shaft, said flute defining a mouth having a narrow end adjacent and coaxial with said bore of said shaft and an open end distal from said narrow end wherein said narrow end of said flute mouth has a diameter greater than the width of said hook and less than the maximum diameter of said weight.

2. The fishing rod of claim 1, wherein said open end of said mouth of said flute has a diameter greater than the maximum diameter of said weight.

3. The fishing rod of claim 1, wherein said flute is formed with a lip extending from said open end of said mouth of said flute to around an outer surface of said flute, wherein said lip has a radius greater than the width of said hook.

4. The fishing rod of claim 2, wherein said flute is formed with a lip extending from said open end of said mouth of said flute to around an outer surface of said flute, wherein said lip has a radius greater than the width of said hook.

5. The fishing rod of claim 1, further including a plurality of hook-and-gangion lines attached to said fishing line, wherein said hook-and-gangion line pairs are attached to said fishing line at a sufficient distance spaced apart from each other so that said hook attached to a first gangion line will be spaced distal from the adjacent gangion line.

6. The fishing rod of claim 2, further including a plurality of hook-and-gangion lines attached to said fishing line, wherein said hook-and-gangion line pairs are attached to said fishing line at a sufficient distance spaced apart from each other so that said hook attached to a first gangion line will be spaced distal from the adjacent gangion line.

7. The fishing rod of claim 6, wherein said flute is formed with a lip extending from said open end of said mouth of said flute to around an outer surface of said flute, wherein said lip has a radius greater than the width of said hook.

8. The fishing rod of claim 1, wherein said flute is formed from a piece separate from said shaft.

9. The fishing rod of claim 2, wherein said flute is formed with a plurality of inwardly extending tabs that extend into the mouth of said flute so that, when said weight is disposed in the mouth of said flute, said weight abuts said tabs.

10. The fishing rod of claim 3, wherein said flute is formed with a plurality of inwardly extending tabs that extend into the mouth of said flute so that, when said weight is disposed in the mouth of said flute, said weight abuts said tabs.

11. The fishing rod of claim 2, wherein said flute has a body that defines a plurality of slits such that, when said weight is disposed in the mouth of said flute, said weight is seated over said slits.

12. The fishing rod of claim 3, wherein said flute has a body that defines a plurality of slits such that, when said weight is disposed in the mouth of said flute, said weight is seated over said slits.

13. A fishing rod comprising
    a handle;
    a shaft having a first end attached to said handle, a free end distal from said end attached to said handle, and a bore extending longitudinally therethrough, wherein said bore is dimensioned to receive a fishing line, the fishing line including a jig line to which a plurality of hooks having a selected width are attached and a free end to which a weight having a diameter greater than the width of the hooks is attached; and
    a flute attached to said free end of said shaft, said flute defining a mouth having a narrow end adjacent and coaxial with said bore of said shaft and an open end distal from said narrow end wherein said narrow end of said flute mouth has a diameter sufficient to allow the jig line hooks to pass into said bore of said shaft and is further sized to receive the weight at the end of the jig line and prevent movement of the weight into said bore of said shaft.

14. The fishing rod of claim 13, wherein said flute is formed with a plurality of inwardly extending tabs that extend into the mouth of said flute so that, when said weight is received in the mouth of said flute, said weight abuts said tabs.

15. A fishing rod for use with a jig line having a plurality of hooks attached thereto, the hooks having a selected width, the jig line also having a free end to which a weight is attached, the weight having a diameter greater than the width of the hooks, comprising:
    a handle;
    a shaft having a first end attached to said handle, a free end distal from said end attached to said handle, and a bore extending longitudinally therethrough, wherein said bore is dimensioned to receive the jig line including the jig line hooks; and a flute attached to said free end of said shaft, said flute defining a mouth having a narrow end adjacent and coaxial with said bore of said shaft and an open end distal from said narrow end wherein said narrow end of said flute mouth has a diameter sufficient to allow the jig line hooks to pass into said bore of said shaft and is further sized to receive the weight at the end of the jig line and prevent movement of the weight into said bore of said shaft.

16. The fishing rod of claim 15, wherein said flute is formed with a lip extending from said open end of said mouth of said flute to around an outer surface of said flute, wherein said lip has a radius greater than the width of the jig line hooks.

17. The fishing rod of claim 15, wherein said flute is formed with a plurality of inwardly extending tabs that extend into the mouth of said flute so that when said weight is received in the mouth of said flute, said weight abuts said tabs.

18. The fishing rod of claim 15 wherein said flute has a body that defines a plurality of slits such that, when said weight is disposed in the mouth of said flute, said weight is seated over said slits.

19. The fishing rod of claim 16, wherein said flute is formed with a plurality of inwardly extending tabs that extend into the mouth of said flute so that, when said weight is received in the mouth of said flute, said weight abuts said tabs.

20. The fishing rod of claim 16, wherein said flute has a body that defines a plurality of slits such that, when said weight is disposed in the mouth of said flute, said weight is seated over said slits.

* * * * *